United States Patent
Serna (10) Patent No.: US 12,014,608 B2
(45) Date of Patent: Jun. 18, 2024

(54) OBJECT RECOGNITION SUBJECT TO A THROTTLING EFFECT

(71) Applicant: Bank of America Corporation, Charlotte, NC (US)

(72) Inventor: Daniel J. Serna, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 125 days.

(21) Appl. No.: 17/896,264

(22) Filed: Aug. 26, 2022

(65) Prior Publication Data

US 2024/0071184 A1  Feb. 29, 2024

(51) Int. Cl.
 G06Q 40/00 (2023.01)
 G06T 7/00 (2017.01)
 G07F 19/00 (2006.01)

(52) U.S. Cl.
 CPC .......... *G07F 19/207* (2013.01); *G06T 7/0002* (2013.01)

(58) Field of Classification Search
 None
 See application file for complete search history.

(56) References Cited

U.S. PATENT DOCUMENTS

| | | | |
|---|---|---|---|
| 9,159,203 B2* | 10/2015 | Priesterjahn | G07F 19/20 |
| 2019/0197652 A1* | 6/2019 | Artico | G06F 1/3293 |
| 2021/0049583 A1* | 2/2021 | Wurmfeld | G07F 19/211 |
| 2022/0091660 A1* | 3/2022 | Nakamura | G06F 1/3206 |
| 2022/0365586 A1* | 11/2022 | Kim | G06F 1/324 |
| 2023/0062587 A1* | 3/2023 | Norbeck | A61J 1/065 |

OTHER PUBLICATIONS

Gauen et al., "Low-Power Image Recognition Challenge," https://engineering.purdue.edu/HELPS/Publications/papers/2017ASPDAC.pdf, IEEE 2017.
"CPU vs. GPU: Making the Most of Both," https://www.intel.com/content/www/us/en/products/docs/processors/cpu-vs-gpu.html, Intel Corporation, Retrieved on Jul. 31, 2022.
Renukasoni, "Image Detection, Recognition and Image Classification with Machine Learning," https://medium.com/ai-techsystems/image-detection-recognition-and-image-classification-with-machine-learning-92226ea5f595, Jul. 26, 2019.
"Object Classification (Electric Car and Electric Bus Classification)," https://medium.com/ai-techsystems/object-classification-electric-car-and-electric-bus-classification-d1df8b26b1ad, Sep. 10, 2021.
"What is a GPU?" https://www.intel.com/content/www/us/en/products/docs/processors/what-is-a-gpu.html, Intel Corporation, Retrieved on Jul. 26, 2022.
"What is Image Recognition and How is it Used?" https://www.mvgreatlearning.com/blog/image-recognition/#:~:text=Image%20recognition%20refers%20to%20technologies,such%20as%20images%20of%2animals., Great Learning Team, Jan. 15, 2022.

* cited by examiner

*Primary Examiner* — Olabode Akintola
(74) *Attorney, Agent, or Firm* — Weiss & Arons LLP (57) ABSTRACT

Apparatus and methods for dynamically controlling application of a graphic processing unit ("GPU") based on the current processing needs is described. A number of objects in each image may be detected. A machine learning model may be utilized to detect and classify objects in each image. Based on the number of detected objects, the GPU could be switched on to provide increased image processing performance. Dynamically turning the GPU on/off may reduce power consumption. When the GPU is turned off, a central processing unit ("CPU") may be used to perform image processing.

12 Claims, 8 Drawing Sheets

OBJECT RECOGNITION SUBJECT TO A THROTTLING EFFECT

FIELD OF TECHNOLOGY

This application describes systems for improving the operation of an Automated Teller Machine ("ATM") by providing improved security for the ATM and reducing power consumption of the ATM.

BACKGROUND

Many ATMs are positioned in public areas such as street corners, shopping malls and sport stadiums. Positioning ATMs in public areas allows customers to access the ATMs easily and conveniently. However, there is also a downside to positioning ATMs in public areas. Public areas expose the ATM to increased risk of theft or vandalism. Additionally, public areas may be crowded. It may therefore be difficult to identify a perpetrator within a crowd of innocent bystanders.

It would be desirable to provide a surveillance system for an ATM that is capable of detecting and identifying potential perpetrators that vandalize an ATM or harass ATM customers. It would further be desirable to provide such a surveillance system that does not consume inordinately more power relative to ATMs that do not employ the surveillance system. Accordingly, it is desirable to provide apparatus and methods for OBJECT RECOGNITION SUBJECT TO A THROTTLING EFFECT.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus and methods for an ATM surveillance system are provided. Methods may improve the operation of the ATM. Methods may include using an image sensor to detect objects within a threshold distance of the ATM. Methods may include utilizing image recognition techniques and algorithms to classify the detected objects. Image recognition may include using software to detect and identify objects, places, people, writing and actions in captured images.

Image recognition may involve acquiring an image. The image may be a frame of a video file. A video file may be defined by a series of still images. To the human eye, viewing the series of still images at a threshold speed gives the appearance of motion. The speed at which video frames in a video file are presented on a screen is the "frame rate."

Each still image in the series may be termed a video frame. A video file may include multiple video frames. Each video frame defines an area (e.g., length/width) and includes content that corresponds to visual properties of a still image. Each video frame may include a number of pixels. A pixel may refer to the smallest, controllable, visual, digital element of an image that is capable of being represented electronically on a screen. A pixel is typically represented as a two-dimensional shape, such as a square, and can only contain one color at a time. The colors associated with each pixel in an image collectively define an image.

After acquiring an image, image recognition may involve processing the image. A machine learning model may process the image. Processing the image may include identifying patterns in the image and making decisions about how to identify or classify content depicted in the image based on the detected patterns. Over time, a machine learning model may improve its ability to identify or classify content because the model is programmed to learn from previous decisions. An illustrative machine learning model may include AdaBoost, Naive Bayes, Support Vector Machine, Random Forests and neural network such as Artificial Neural Networks or Convolutional Neural Networks.

Generally, a neural network implements machine learning by passing an input through a network of neurons—called layers—and providing an output. The more layers of neurons that are included in the neural network, the "deeper" the neural network. A neural network learns from outputs flagged as erroneous and adapts its neuron connections such that the next time the neural network receives a particular input it generates a more relevant output.

To effectively provide relevant outputs, a neural network must first be trained by analyzing training data sets. The training data sets may include patterns in images that are associated with known objects or content. Neural networks learn from the training data sets and rearrange interconnection between layers of the network in response to processing the training data. The strength or weight of a connection between layers of the neural network can vary. A connection between two or more layers can be strong, weak or anywhere in between. A neural network may self-adapt by adjusting the strength of the connections among its layers to generate more accurate outputs.

The machine learning model may classify each pixel in the image with a numeric representation based on its color intensity. For a machine learning model to recognize content within an image, the model looks for patterns and regularities in the numerical data corresponding to the pixels in the image. Based on the patterns and regularities, the machine learning model identifies or classifies content depicted in the image.

Image recognition may require significant computer processing power. For example, the system that won a 2016 image recognition competition analyzed 7,347 images and achieved a 9.44% normalized mean average precision of image recognition with an average power consumption of 4.7 watts ("W"). Methods for further reducing the power consumption of image recognition processing while maintaining threshold accuracy and precision levels of image recognition are provided.

An ATM may include one or more Graphics Processing Units ("GPUs"). A GPU is a hardware device capable of performing concurrent math computations over large data sets. GPU's do not operate as fast as central processing units ("CPUs"). However, GPUs are capable of processing larger quantities of data per unit of time. Thus, even though each individual GPU operation may execute more slowly, the parallelism of applying computational operations to more data in parallel exceeds CPU performance, allowing machine learning models to be fully trained faster and to perform image recognition faster.

For example, a GPU enabled ATM may process 30 video frames per second. A CPU may only be capable of processing 4 video frames per second. Using a GPU to detect and identify objects and people within captured video frames provides improved performance over using a CPU for the same computational task. Using a GPU, more images can be processed accurately and precisely in a less time when compared to using a CPU. However, GPUs are power hungry components. Turning off a GPU can save significant power or extend battery life.

Apparatus and methods described herein dynamically activate or deactivate a GPU based on the current image processing needs of a device. The GPU may be dynamically switched on to provide needed image recognition performance. For example, in the context of an ATM, typical images extracted from surveillance video footage captured in the vicinity of the ATM may only include 10 objects (e.g., people, cars, trees, buildings). To process those images, a there may not be a need to utilize the increased performance of a GPU.

However, at certain times, images captured in the vicinity of the ATM may include more than 10 objects per image. For example, an ATM may be positioned near a stadium or office building. At the end of a workday or after an entertainment event, hundreds or even thousands of people may leave the office building or stadium within a small time-window. Additionally, an increased number of vehicles, such as taxis and busses may be present to provide transportation for people leaving the office building or stadium. Surveillance images captured in the vicinity of the ATM may include hundreds, thousands or even tens of thousands of objects.

During such time windows, a GPU within the ATM may be activated. The GPU may provide the necessary processing power for the ATM to apply image recognition to an increased number captured images and identify the increased number of objects in each captured image. Because expeditious image recognition provided by the GPU is needed to detect and identify perpetrators who may vandalize the ATM or harass ATM customers, it is important that any such objects are identified quickly, such as in real-time, so that any act or potential act of vandalism is detected and possibly mitigated or prevented.

A machine learning model performing image recognition for an ATM may be programmed to dynamically activate to handle a larger computation load. The machine learning model may be programmed to deactivate the CPU when the GPU is activated. In some embodiments, when the GPU is activated, the CPU may remain activated to provide additional processing power to meet the increased computing demands of performing image recognition on images that include increased number of objects.

The machine learning model performing image recognition may be programmed to dynamically deactivate the GPU to conserve power when less objects are detected in each captured image. The machine learning model may be programmed to activate the CPU when the GPU is deactivated.

Deactivating the GPU may be useful in operating environments with intermittent or unreliable power sources and the ATM or other device regularly relies on backup battery power.

Illustrative pseudo code for programming the machine learning model to dynamically toggle activation/deactivation of a GPU may include:
IF (objects in frame>=threshold) THEN turn GPU on
ELSE turn GPU off Programming the machine learning model to dynamically activate or deactivate the GPU/CPU may reduce power consumption. Programming the machine learning model to dynamically activate or deactivate the GPU/CPU may also reduce bandwidth consumption on network by reducing the amount of data generated by image processing that is transmitted over the network.

Methods may include detecting a threshold number of objects in a vicinity of the ATM or other location. The threshold number of objects may be detected by a change in the number of objects in images captured from the vicinity of the ATM or other device. Captured images may be frames of a video file. The video file may capture footage within a threshold distance of the ATM or other device. In response to detecting that captured images include the threshold number of objects, methods may include activating a GPU on the ATM or other device to process the captured images.

In some embodiments, methods may include processing the captured images using a GPU for a time-window after detecting the threshold number of objects. After expiration of the time-window, methods may include processing frames or images using a CPU. In some embodiments, methods may include processing the captured images using the GPU until the number of objects in captured images falls below a threshold level.

Methods may include capturing a video file that includes objects within the threshold distance of the ATM. Methods may include using the GPU, processing more frames per second of the video file compared to using a CPU. Methods may include, before activating the GPU, processing the frames of the video file using a CPU. Processing the video frames using the GPU may consume more power per second of video file compared to processing the frames using the CPU.

The ATM may be a first ATM. The GPU may be a first GPU. In response to detecting that a second ATM within a predetermined radius of the first ATM activates a second GPU, methods may include activating the first GPU on the first ATM. The second ATM may activate the second GPU in response to detecting an increase in the number of objects within a threshold distance of the second ATM. The first ATM may anticipate that although it has not yet detected an increase in the number of nearby objects, because the second ATM already has, the first ATM will also soon detect the increased number of objects. In anticipation of detecting the increased number of objects, the first ATM may activate its GPU and begin processing captured images using the activated GPU.

Processing captured images using a GPU or CPU may include applying a machine learning model that performs image recognition. Based on the processing of captured images, methods may include limiting functionality of the ATM. For example, image recognition may detect, within a captured image, a target object categorized as a security threat. An illustrative security threat may include a weapon or altercation within a captured image.

In response to detecting the security threat, methods may include limiting functionality of the ATM by suspending cash withdrawals at the ATM. In response to detecting the security threat, methods may include deploying a retractable security barrier that prevents access to the ATM. An illustrative retractable security barrier may include security shutters, retractable grilles or roll-up gates.

A security system for an automated teller machine ("ATM") is provided. The system may include an image sensor. The image sensor may capture a video file that includes objects within a threshold distance of the ATM. The system may include a Graphic Processing Unit ("GPU"). The system may include a Central Processing Unit ("CPU"). The system may include an artificial intelligence ("AI") engine comprising machine executable instructions, that when executed by a processor (e.g., GPU or CPU) implements a machine learning model that processes frames or images extracted from the video file.

The AI engine may monitor the video file for a security threat. An illustrative security threat may include identifying a weapon in at least one frame of the video file. In response to detecting a security threat, the AI engine may limit functionality of the ATM.

In response to identifying a security threat, the AI engine may configure the ATM to display an out-of-order message on a screen of the ATM. The out-of-order message may discourage vandalism of the ATM. In response to identifying the security threat, the AI engine further may deploy a security gate that prevents access to the ATM.

In response to identifying a security threat, the AI engine may trigger activation of a plurality of GPUs associated with a plurality of ATMs located within a threshold radius of the ATM. The plurality of ATMs may begin more intensive processing of captured images using their GPUs in response to the detection of the security threat in the vicinity of one ATM.

The AI engine may monitor the video file for a change in a number of objects in each frame of a video file. In response to detecting a change in the number of objects per video frame, the AI engine may continue to monitor the video file for a security threat using the GPU. The AI engine may activate the GPU in response to detecting a news alert reporting a crime within the threshold radius of the ATM.

A GPU may consume more power per second of operation compared to a CPU. The GPU may process more frames of the video file per second compared to the CPU. The AI engine may be programmed to only activate the GPU in response to detecting a security threat or detecting a threshold change in the number of objects in each frame of a video file. When the GPU is not active, the ATM may process frames of the video file using a CPU.

By limiting activation of the GPU, the AI engine may allow the ATM to operate with lower energy consumption rates. For example, the GPU may process at least 30 frames of the video file per second. The CPU may process less than 10 frames of the video file per second. However, the GPU may consume as much as 300 W when operating, while a typical CPU may only consume 80 W during operation.

A security system for an automated teller machine ("ATM") is provided. The system may include an image sensor that captures a video file. The system may include a Central Processing Unit ("CPU"). The system may include an artificial intelligence ("AI") engine comprising machine executable instructions, that when executed by the CPU, configure the ATM to perform various functions.

The AI engine may configure the ATM to monitor the video file for a security threat. The AI engine may monitor the video file by determining a number of objects in each frame of the video file. In response to detecting a security threat in a frame, the AI engine may limit functionality of the ATM. For example, the AI engine may prevent customers from inserting objects into the ATM. The AI engine may deploy a retractable covering that seals one or more openings of the ATM. The AI engine may trigger deployment of coverings that seal openings of the ATM and prevent any foreign objects from being inserted into the ATM.

In response to detecting that the number of objects in a target frame of the video file exceeds a threshold number, the AI engine may activate a Graphic Processing Unit ("GPU"). The GPU may be a local component of the ATM. The GPU may be a part of a remote cloud computing environment. The activated GPU may monitor the video file for a security threat.

The target frame may be a first target frame. The AI engine may deactivate the GPU in response to detecting that the number of objects in a second target frame of the video file is below the threshold number. The ATM may be a first ATM. The GPU may be a first GPU. The AI engine may activate the first GPU in response to detecting that a second ATM has activated a second GPU.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The method steps may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
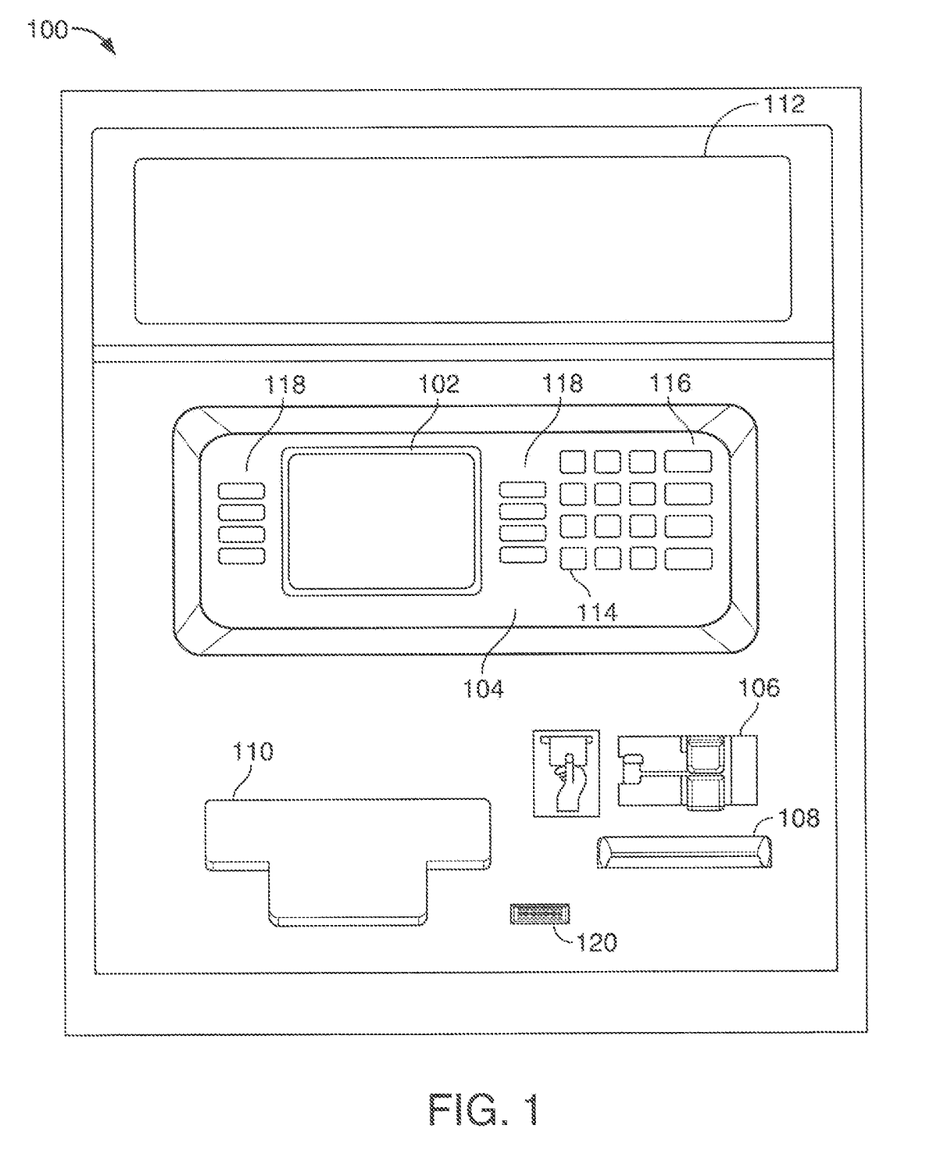
FIG. 1 shows an illustrative apparatus in accordance with principles of the disclosure.

FIG. 1 shows illustrative ATM 100. ATM 100 includes screen 102, keypad 104, card reader port 106, document acceptor 108, item dispenser 110 and security screen 112. Security screen 112 may hide an image sensor such as video camera (not shown). The image sensor may capture a video file showing objects that are present within a threshold distance of ATM 100 and other environmental conditions within a threshold distance of ATM 100.

Screen 102 may display visual information to a customer. Keypad 104 may include alphanumeric keys 114 for the customer to enter numerical and textual data. Keypad 104 may include control keys 116. In some embodiments, control keys 116 may be used to input control information, such as transaction instructions, to ATM 100. Keypad 104 may include soft keys 118. Soft keys 118 may have functions that are dictated by programming and are presented to the customer using information that may be displayed on screen 102.

Card reader port 106 may be the front end of any suitable card reader. The card reader may read magnetically encoded information on transaction instruments such as bank cards.

In some embodiments, ATM 100 may include a contactless chip reader, a wireless transceiver or any other suitable interface for exchanging transaction information with a transaction instrument. The transaction instrument may be a chip, an RFID tag, a smart card, a smartphone or any other suitable device.

In some embodiments, ATM 100 may include a biometric sensor (not shown). The biometric sensor may identify a customer based on a biometric feature of the customer. For example, the biometric sensor may be configured to identify the customer based on all or part of a face, a fingerprint, an iris, a retina, a hand or any other suitable anatomical feature. The biometric sensor may identify the customer based on a behavioral feature such as a signature, a voice, a gait or any other suitable behavioral feature. In some of these embodiments, information received by the biometric sensor may be used, in conjunction with PIN input, to validate the identity of the customer.

For example, the biometric sensor may include an iris scanner. In some of these embodiments, a camera or other image sensor built into ATM 100 may be used as an iris scanner and customer authentication at ATM 100 may require a sequence of an input PIN and an iris or fingerprint scan.

Document acceptor 108 may receive insertion of any suitable documents. For example, document acceptor 108 may receive insertion of envelopes, deposit forms, bills, checks or any other suitable documents. Document acceptor 108 may feed the documents into a scanner that digitizes the documents for image-based transaction processing. Item dispenser 110 may dispense items. For example, item dispenser 110 may dispense bills.

Figure 2:
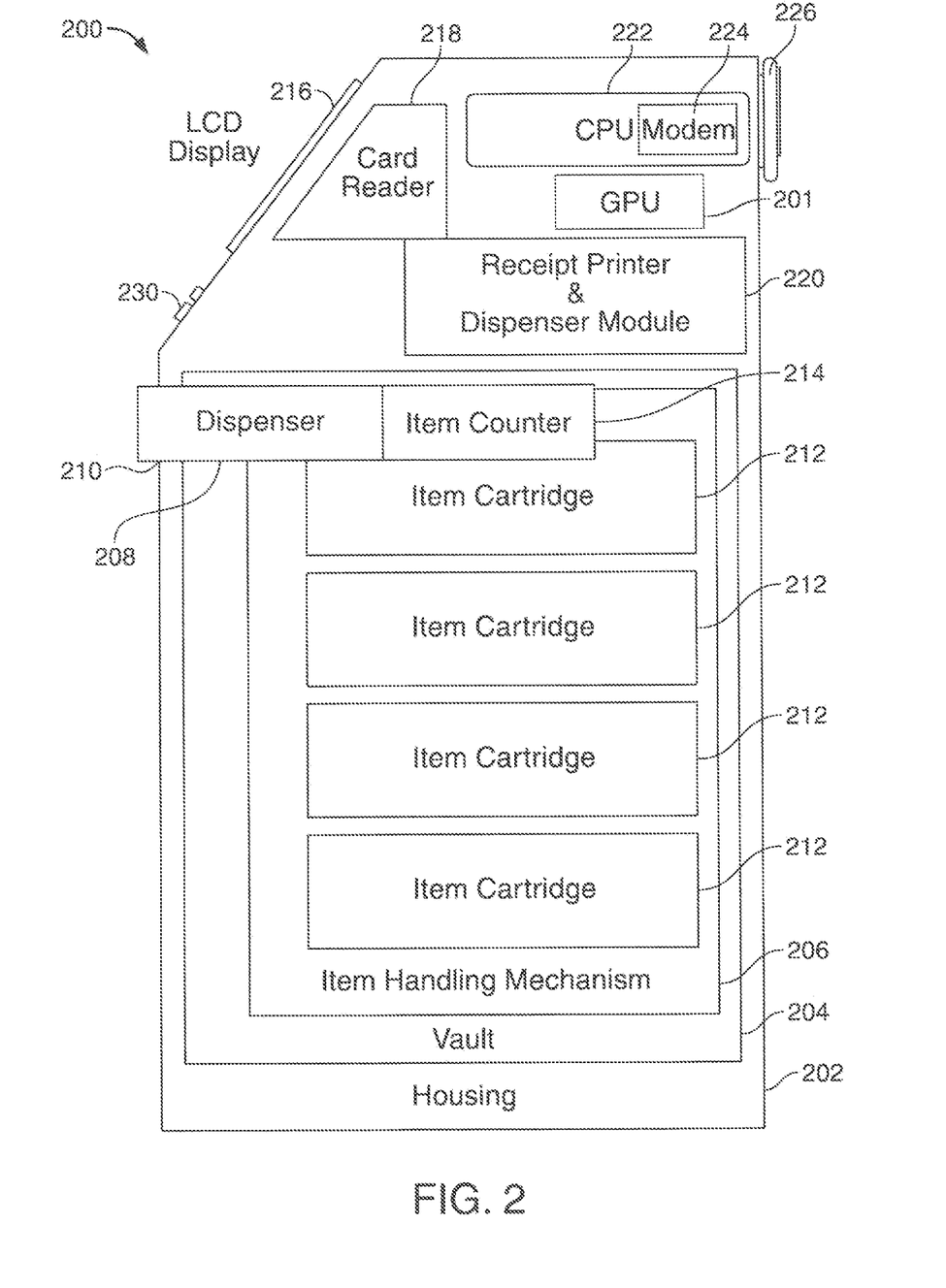
FIG. 2 shows an illustrative apparatus in accordance with principles of the disclosure.

FIG. 2 shows illustrative ATM 200. ATM 200 may have one or more of the features of ATM 100 (shown in FIG. 1). ATM 200 may include housing 202. ATM 200 may include vault 204. Vault 204 may include items (not shown). Item handling mechanism 206 may be present in vault 204. Item handling mechanism 206 may store, arrange, dispense and/or otherwise handle items for dispensing from ATM 200. For example, item handling mechanism 206 may include conveyors (not shown) for positioning and repositioning items for dispensing by dispenser 208 through item port 210. Items (not shown) in item handling mechanism 206 may be contained in item cartridges 212. For example, the items may be bills and item cartridges 212 may be cash cartridges. Item handling mechanism 206 may include item counter 214. Item counter 214 may count items prior to items being dispensed by dispenser 208.

ATM 200 may include screen 216 and a keypad (not shown) for customer interaction. Card reader 218 may be present for receiving transaction information from the customer via a suitable payment instrument. ATM 200 may include receipt printer and dispenser module 220. Receipt printer and dispenser module 220 may provide the customer with a record of a transaction conducted at ATM 200.

CPU 222 may control a customer input/output module ("I/O"), receipt of input PIN and biometric information, dispensing processes, which may include initialization, actuation, dispensing and any other suitable processes, receipt printing and dispensing, transaction channel communications and any other suitable processes. ATM 200 also includes GPU 201. GPU 201 may be activated on demand to process video files captured by an image sensor.

The transaction channel communications may be performed using modem 224, which may be any suitable communication device. Modem 224 may communicate with a local or regional network router (not shown) which may route information to a third party. Service monitor 226 may be provided for a service technician to exchange information and instructions with CPU 222.

ATM 200 may include other hardware components that are not shown in FIG. 2. ATM 200 may include RAM, ROM, and a non-transitory or non-volatile memory. Software applications may be stored within the non-transitory memory and/or other storage media. Software applications may provide instructions to the processor that enable ATM 200 to perform various functions. For example, the non-transitory memory may store software applications used by ATM 200, such as an operating system, application programs, machine learning model, AI engine and an associated database. Alternatively, some or all of computer executable instructions of a node may be embodied in hardware or firmware components of ATM 200.

Software application programs, which may be used by ATM 200, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

Figure 3:
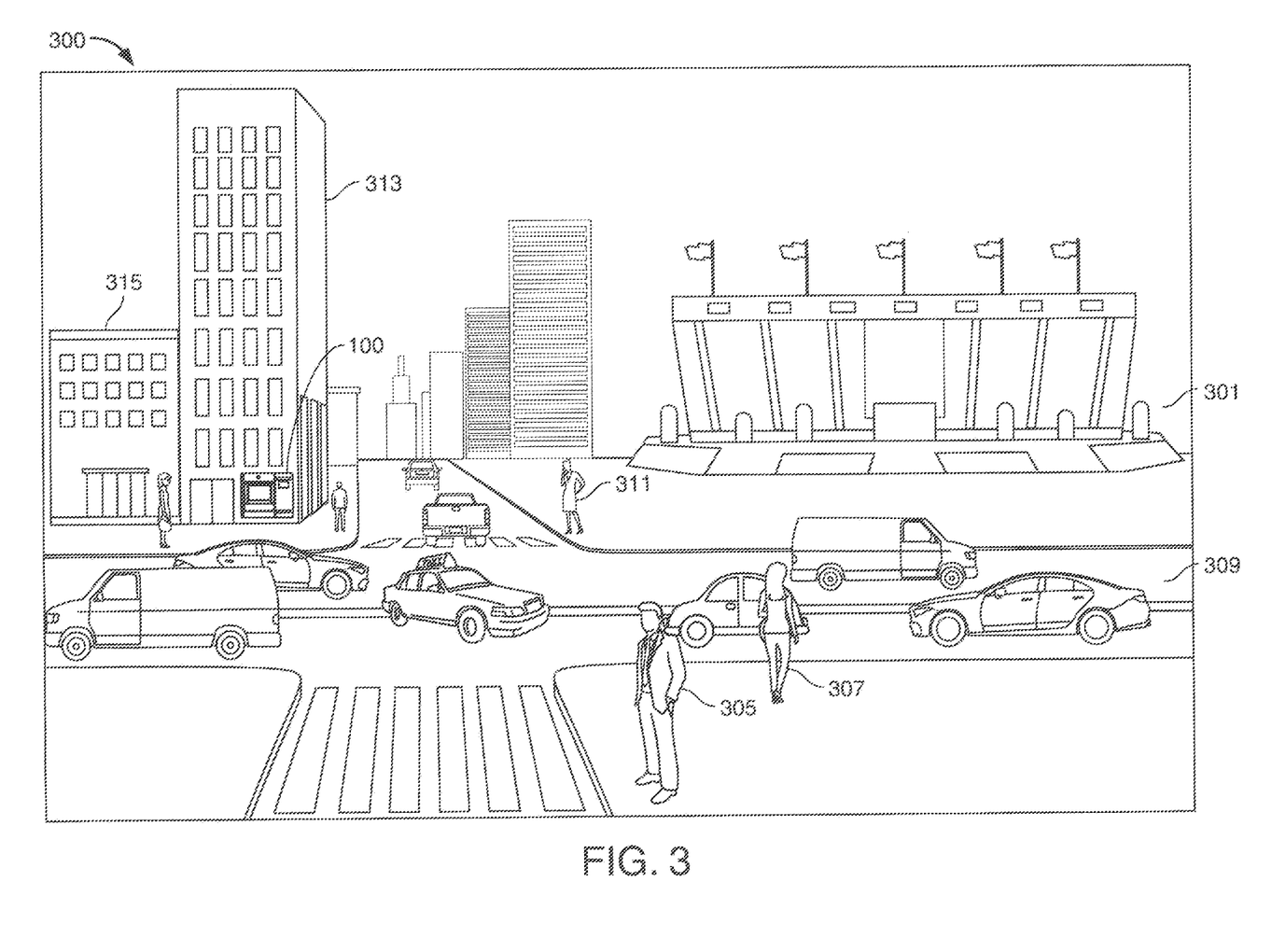
FIG. 3 shows an illustrative scenario in accordance with principles of the disclosure.

FIG. 3 shows state 300 of a public area at time $t_1$. ATM 100 may include an image sensor that captures a video file. The captured video file may include objects present in the public area at time $t_1$. For example, FIG. 3 shows that illustrative objects that may be captured by the image sensor of ATM 100 may include people 305, 307 and 311. Illustrative objects may include vehicles travelling on roadway 309. Illustrative objects may include buildings 313 and 315. Illustrative objects may include stadium 301.

An AI engine within ATM 100 may process the frames of the video file captured at time $t_1$. The processing may include image recognition that identifies and classifies one or more objects included in each frame. Based on the number of objects detected in the public area at time $t_1$, ATM 100 may utilize a CPU to process frames of the captured video file.

Figure 4:
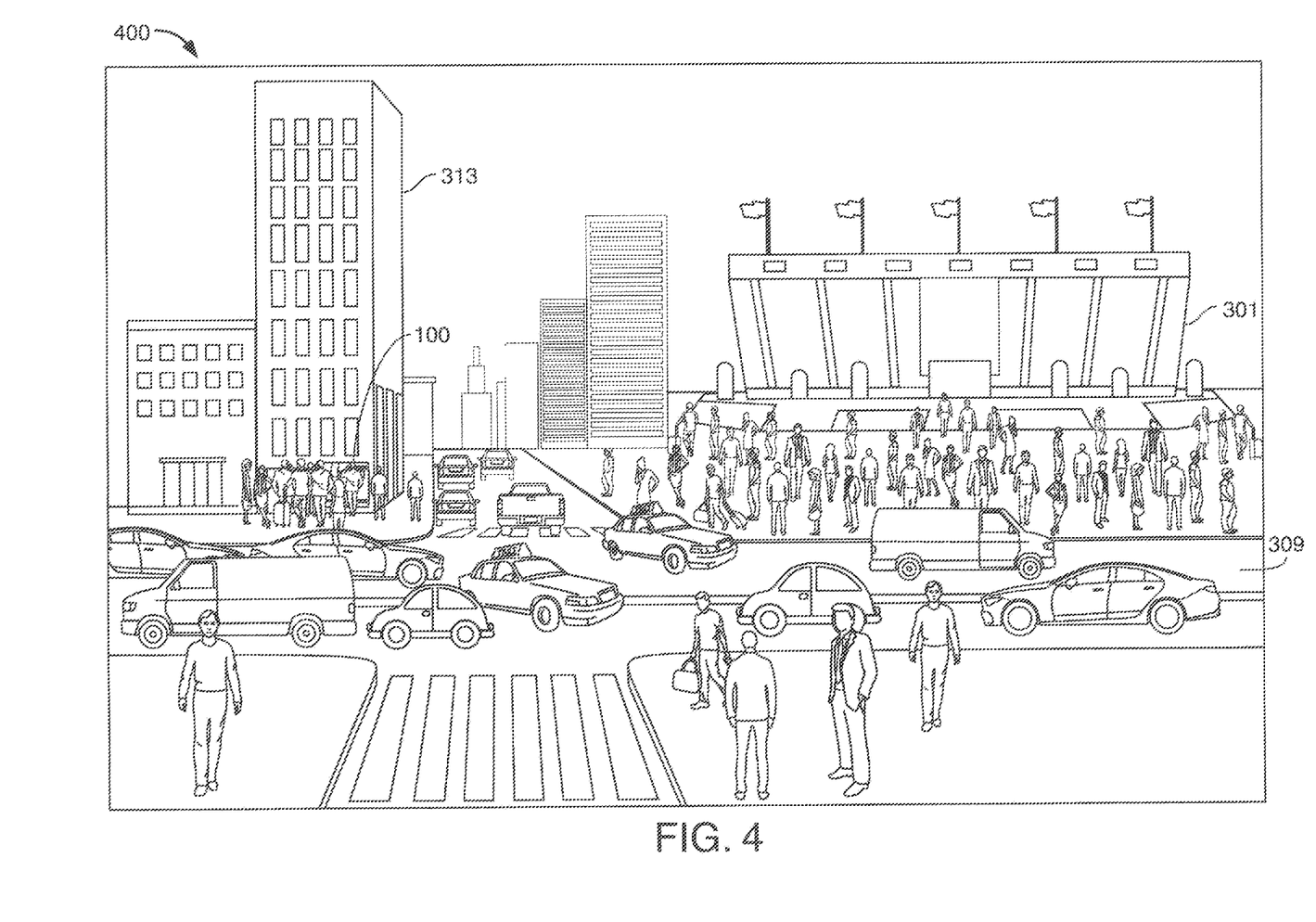
FIG. 4 shows an illustrative scenario in accordance with principles of the disclosure.

FIG. 4 shows state 400 of the public area shown in FIG. 3 at time $t_2$. State 400 may be captured in a video frame recorded by ATM 100. The captured video frame includes objects present in the public area at time $t_2$. FIG. 4 shows that there are more objects presented in the public area at time $t_2$ than there were at time $t_1$.

For example, FIG. 4 shows that illustrative objects that may be captured by the image sensor of ATM 100 may include throngs of people leaving stadium 301. Illustrative objects may include vehicles travelling on roadway 309. Illustrative objects may include people gathering in front of building 313 and in front of ATM 100. An AI engine within ATM 100 may process the frames of a captured video file. The processing may include image recognition that identifies and classifies one or more objects included in each frame.

ATM 100 may detect that the number of objects detected in a video file captured at time $t_2$ exceeds a threshold number. Based on the number of objects detected in the public area, ATM 100 may utilize a GPU to process frames of a captured video file. The GPU may be activated to process each object detected in a frame of the captured video file. The GPU may provide additional processing power needed to process the additional objects present in the public area at time $t_2$.

Figure 5:
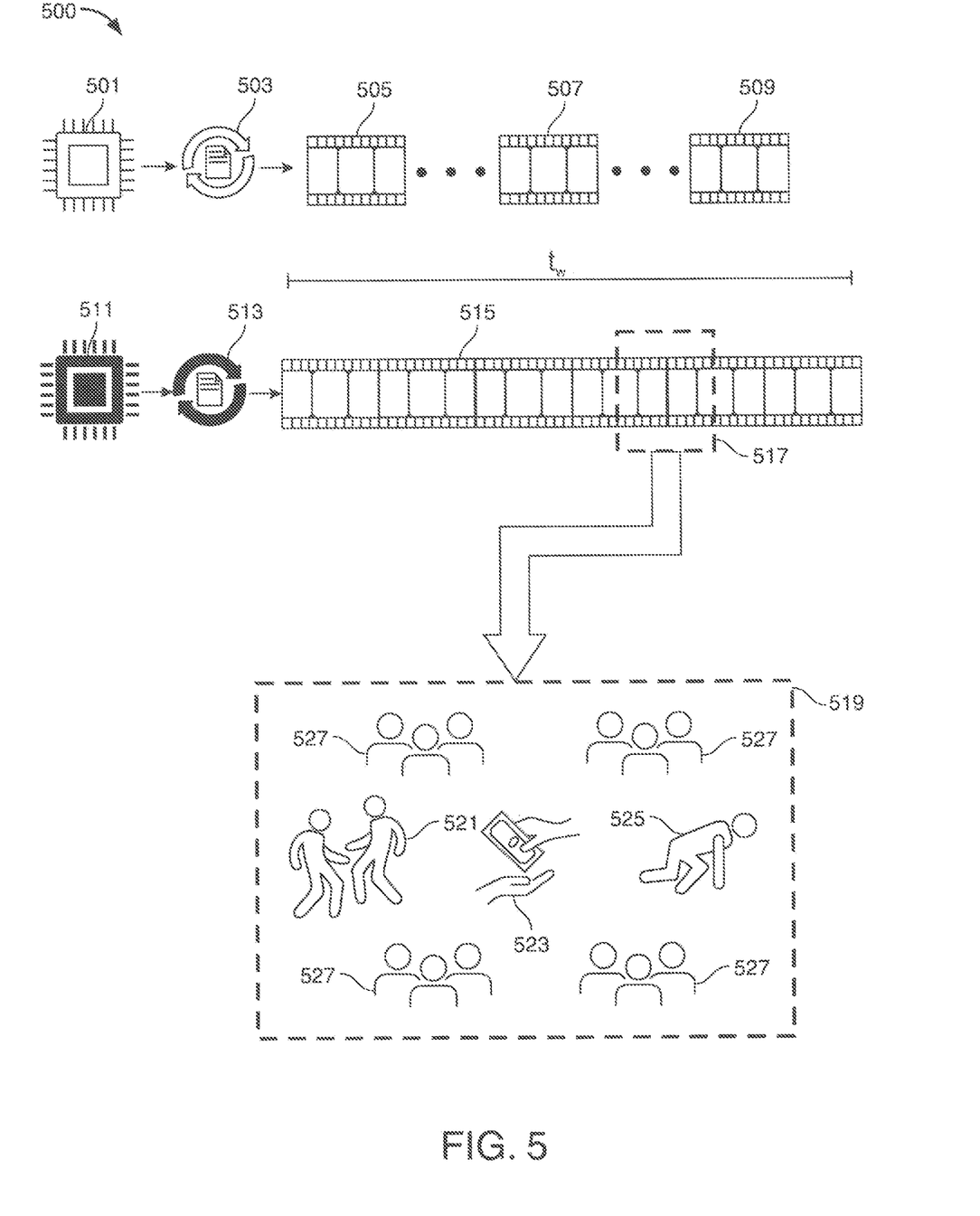
FIG. 5 shows illustrative operation of apparatus in accordance with principles of the disclosure.

FIG. 5 shows illustrative process 500. Process 500 shows that CPU 501 is initially being used to process frames 505, 507 and 509 extracted from a video file. Processing frames 505, 507 and 509 may include utilizing AI engine 503 to implement image recognition to identify objects captured by frames 505, 507 and 509. Process 500 shows that over time-window $t_w$, CPU 501 is unable to process more than frames 505, 507 and 509.

Process 500 also shows that GPU 511 may be used to process frames 515. Process 500 shows that frames 515 include more frames than all of frames 505, 507 and 509. Process 500 includes utilizing AI engine 513 to implement image recognition to identify objects captured by frames 515. In some embodiments, GPU 511 and CPU 501 may both use AI engine 503 or AI engine 513. Process 500 shows that over time-window $t_w$, GPU 511 processes more frames than CPU 501. However, over time-window $t_w$, GPU 511 may consume more power than CPU 501.

Process 500 also shows how GPU 511 may process one or more of frames 515 and identify a security threat. GPU 511 may be activated when a threshold number of objects are detected in one or more of frames 515. GPU 511 may provide additional processing power needed to perform image recognition on frames that include a threshold number of objects. GPU 511 may be capable of detecting a security threat even when the threshold number of objects are present in a frame.

Process 500 shows that GPU 511 has processed frames 517. Frames 517 are a subset of the frames included in frames 515. Objects 519 show results of applying image recognition to frames 517. GPU 511 has identified objects 521, 523 and 525 as corresponding to a security threat. GPU has identified objects 521, 523 and 525 from among other objects 527.

For example, GPU 511 may identify and classify objects 521, 523 and 525 as corresponding to altercation 521, which then lead to transfer of money 523 and then lead to escape of perpetrator 525.

Figure 6:
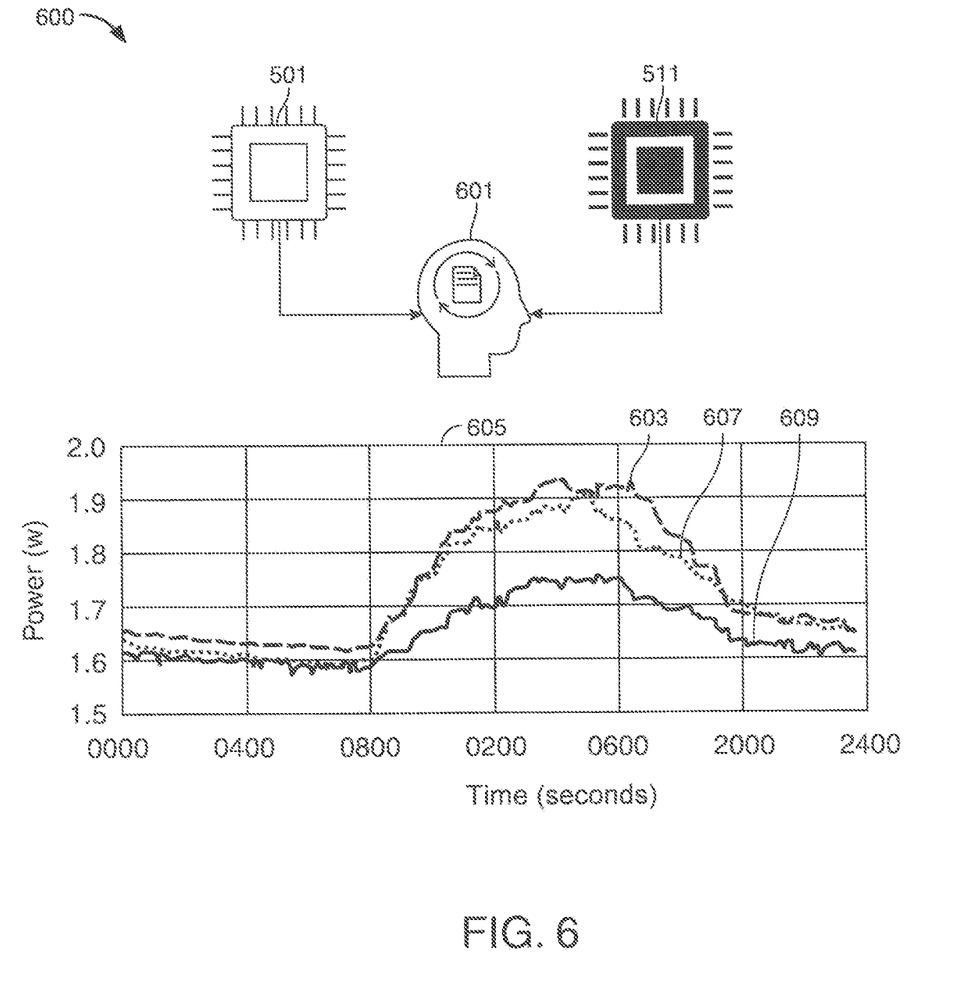
FIG. 6 shows an illustrative operation and associated performance metrics in accordance with principles of the disclosure.

FIG. 6 shows illustrative performance metrics 600. Performance metrics 600 includes graph 605. Graph 605 shows power consumption 603 when GPU 511 is used to execute AI engine 601 and perform image recognition. Performance metrics 600 show power consumption 607 when CPU 501 is used to execute AI engine 601 and perform image recognition. Graph 605 shows that GPU 511 consumes more power than CPU 501. However, graph 605 also shows that the difference in power consumed between using CPU 501 or GPU 511 to perform image recognition is small. When CPU 501 is the only processor available to perform image recognition, CPU 501 may require additional power to process images that each include more than a threshold number of objects.

However, graph 605 shows that dynamically determining whether to use CPU 501 or GPU 511 for a given number of frames or over a threshold time window may only use power consumption 609. Dynamically determining whether to use CPU 501 or GPU 511 may include keeping each of CPU 501 and GPU 511 operating at optimal power consumption levels for given images or time windows. Graph 605 shows that such dynamic throttling of CPU 501 or GPU 511 may lead to power consumption 609 instead of power consumptions 605 or 607. Graph 605 shows that power consumption 609 is less than power consumptions 605 or 607.

Figure 7:
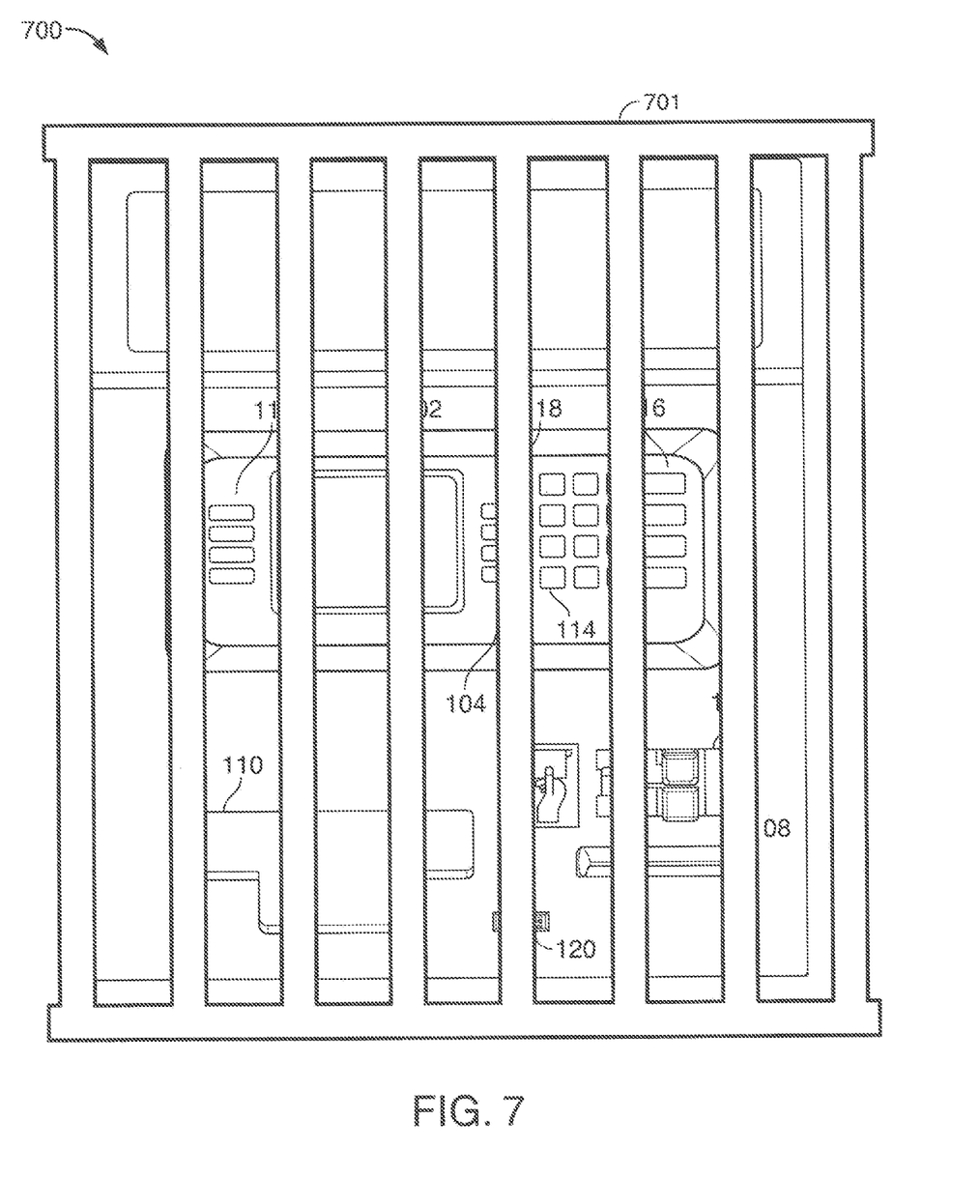
FIG. 7 shows illustrative apparatus in accordance with principles of the disclosure.

FIG. 7 shows illustrative scenario 700. In scenario 700, AI engine 601 has deployed security gate 701 to protect ATM 100. AI engine may deploy security gate 701 in response to a security threat detected in one or more video frames. For example, security gate 701 may be deployed in response to classifying objects 521, 523 and 525 within frames 517 (all shown above in FIG. 5) as corresponding to a security threat. AI engine 601 may retract security gate 701 when the threshold number of objects in captured video frames falls below a threshold number.

Figure 8:
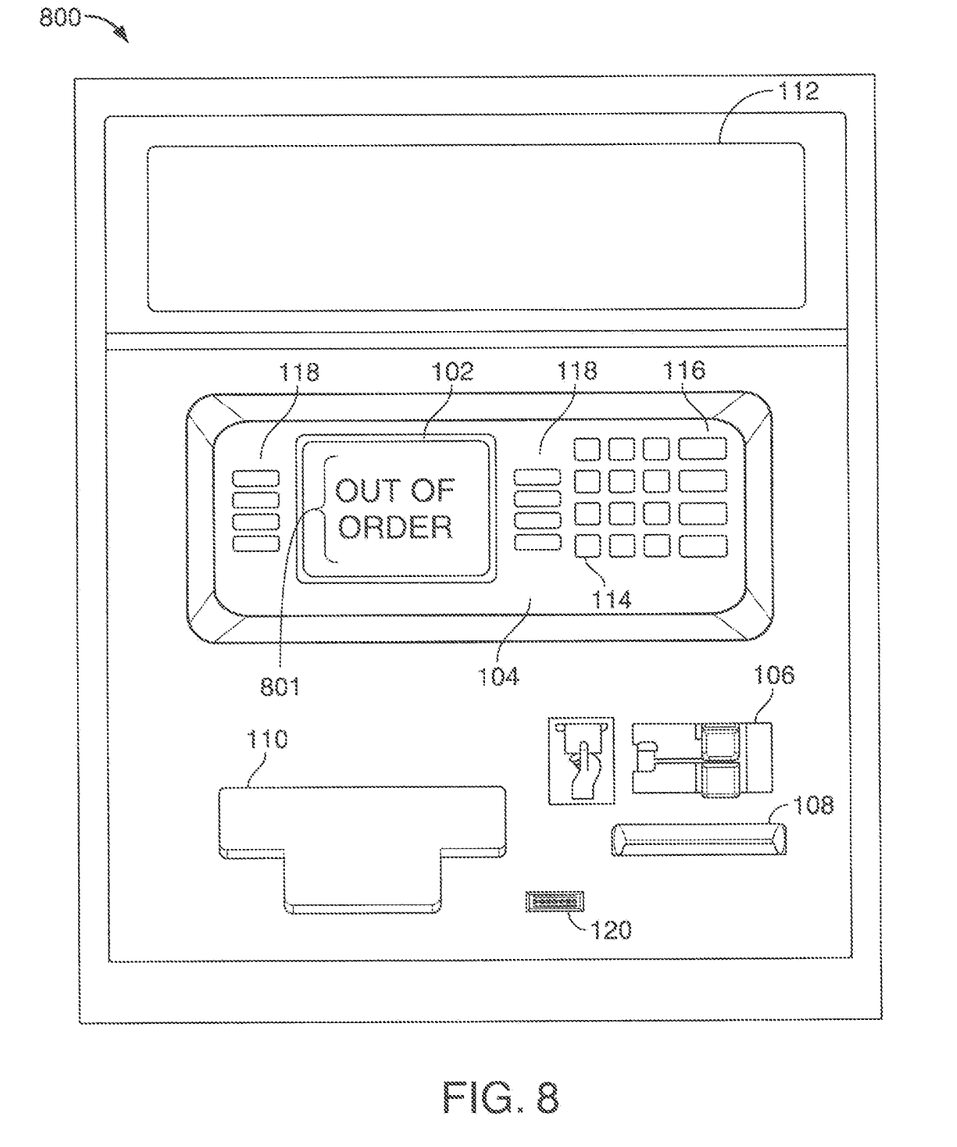
FIG. 8 shows illustrative apparatus in accordance with principles of the disclosure.

FIG. 8 shows an illustrative view 800 of ATM 100. View 800 shows that screen 102 displays message 801. Message 801 states that ATM 100 is "out of order." However, despite the display of message 801 on screen 102, ATM 100 may be fully operational. Message 801 may be presented in response to detecting a security threat.

For example, another ATM within a threshold distance of ATM 100 may have detected a security threat within one or more video frames. As a precautionary measure, ATM 100 may be configured to display message 801. Message 801 may discourage customers from using ATM 100 within a predetermined time window after detecting a security threat. Message 801 may discourage potential perpetrators from vandalizing ATM 100.

Thus, methods and apparatus for an OBJECT RECOGNITION SUBJECT TO A THROTTLING EFFECT are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A method for reducing power consumption and improving secure operation of an Automated Teller Machine ("ATM"), the method comprising:
    using an image sensor to detect objects within a threshold distance of the ATM;
    in response to detecting a threshold number of objects, activating a Graphic Processing Unit ("GPU") on the ATM;
    for a time-window after detecting the threshold number of objects, processing the objects within the threshold distance of the ATM using the GPU;
    based on the processing, limiting functionality of the ATM; and
    before activating the GPU, processing the objects detected within the threshold distance of the ATM using a Central Processing Unit ("CPU").

2. The method of claim 1 further comprising:
    capturing a video file that includes the objects within the threshold distance of the ATM; and
    using the GPU, processing more frames per second of the video file compared to the CPU.

3. The method of claim 1, wherein processing the objects using the GPU consumes more power per second compared to processing the objects using the CPU.

4. The method of claim 1 wherein the ATM is a first ATM and the GPU a first GPU, the method further comprising, in response to detecting that a second ATM within a predetermined radius of the first ATM activates a second GPU, the first ATM activates the first GPU.

5. The method of claim 1 further comprising, after expiration of the time-window, processing the objects detected within the threshold distance of the ATM using a Central Processing Unit ("CPU").

6. The method of claim 1 further comprising, detecting the threshold number of the objects based on detecting a change in a number of objects in each frame of a video file captured by the ATM.

7. The method of claim 1 wherein:
    the processing comprising applying a machine learning technique and using the machine learning technique detecting, within the threshold number of objects, an image categorized as a security threat; and in response to detecting the security threat, limiting the functionality of the ATM by suspending cash withdrawals at the ATM.

8. An energy-efficient security system for an automated teller machine ("ATM"), the security system comprising:
   an image sensor that captures a video file;
   a Central Processing Unit ("CPU"); and
   an artificial intelligence engine comprising machine executable instructions, that when executed by the CPU:
   monitor the video file for:
     a security threat; and
     determine a number of objects in each frame of the video file;
   in response to detecting the security threat, limit functionality of the ATM; and
   in response to detecting that the number of objects in a target frame of the video file exceeds a threshold number:
     activate a Graphic Processing Unit ("GPU"); and
     use the GPU to monitor the video file for the security threat.

9. The energy-efficient security system of claim 8 wherein the target frame is a first target frame, the machine executable instructions, that when executed by the CPU, deactivate the GPU in response to detecting that the number of objects in a second target frame of the video file is below the threshold number.

10. The energy-efficient security system of claim 8 wherein the ATM is a first ATM and the GPU a first GPU, the machine executable instructions, that when executed by the CPU, activate the first GPU in response to detecting that a second ATM has activated a second GPU.

11. The energy-efficient security system of claim 8 wherein the machine executable instructions, when executed by the CPU, activate the GPU in response to detecting a news alert reporting a crime within a threshold radius of the ATM.

12. The energy-efficient security system of claim 8 wherein:
   the GPU processes at least 30 frames of the video file per second;
   the CPU processes less than 10 frames of the video file per second; and
   the GPU uses at least 4× more power than the CPU.

* * * * *